(12) United States Patent
Chang

(10) Patent No.: US 7,876,578 B2
(45) Date of Patent: Jan. 25, 2011

(54) INSERTION SLOT SHIELDING MECHANISM FOR AN ELECTRONIC DEVICE

(75) Inventor: Feng Chang, Keelung (TW)

(73) Assignee: Altek Corporation, Hsinchu (TW)

( * ) Notice: Subject to any disclaimer, the term of this patent is extended or adjusted under 35 U.S.C. 154(b) by 459 days.

(21) Appl. No.: 12/071,180

(22) Filed: Feb. 19, 2008

(65) Prior Publication Data

US 2009/0154074 A1 Jun. 18, 2009

(30) Foreign Application Priority Data

Dec. 12, 2007 (TW) .............................. 96221108 U

(51) Int. Cl.
*H05K 9/00* (2006.01)
(52) U.S. Cl. ..................... 361/816; 361/801; 361/803
(58) Field of Classification Search ................. 361/816, 361/818, 800–803, 730, 752, 679.01, 728, 361/736, 737, 688, 704–705, 718, 719, 748, 361/756, 753; 439/76.1, 152, 153, 945–946
See application file for complete search history.

(56) References Cited

U.S. PATENT DOCUMENTS

| 4,804,238 | A | * | 2/1989 | Bischof et al. | ............ 312/138.1 |
| 7,136,291 | B2 | * | 11/2006 | Tu et al. | ...................... 361/797 |
| 7,375,955 | B2 | * | 5/2008 | Xu | ......................... 361/679.55 |
| 7,564,691 | B2 | * | 7/2009 | Kuwajima et al. | .......... 361/728 |
| 7,599,723 | B2 | * | 10/2009 | Lee et al. | .................. 455/575.4 |
| 7,663,881 | B2 | * | 2/2010 | Kuo | ............................. 361/692 |
| 7,746,625 | B2 | * | 6/2010 | Lee et al. | ............... 361/679.02 |

* cited by examiner

*Primary Examiner*—Hung S Bui
(74) *Attorney, Agent, or Firm*—Rosenberg, Klein & Lee

(57) ABSTRACT

An insertion slot shielding mechanism for an electronic device is used to shield an insertion slot provided in an opening of a casing of an electronic device. The insertion slot shielding mechanism includes a shielding means and an elastic pushing piece. The shielding means corresponds to the opening and is slidably connected to the opening of the casing. One end of the elastic pushing piece is connected to a side wall within the electronic device corresponding to the opening of the casing, and the other end thereof is kept to abut against the shielding means. The elastic force of the elastic pushing piece allows the shielding means to be located in a position to shield the opening of the casing.

9 Claims, 3 Drawing Sheets

INSERTION SLOT SHIELDING MECHANISM FOR AN ELECTRONIC DEVICE

BACKGROUND OF THE INVENTION

1. Field of the Invention

The present invention is related to a shielding mechanism, and more particular to a shielding mechanism for shielding an insertion slot of an electronic device.

2. Description of Related Art

The current electronic product such as a camera or a mobile phone is provided with several interfaces for other external devices. In addition to the insertion slot for a memory card, the electronic product is also equipped with an insertion hole for an external power input, an insertion slot for a USB connector or an insertion hole for an image transmission terminal. The earlier electronic product lets the input/output insertion slot (hole) to be exposed to both sides of the electronic product, and thus dust may be accommodated in the insertion slot easily to affect the reliability of electrical connection.

The current electronic product such as a camera or a mobile phone is often equipped with a rubber soft cover to protect the above-mentioned insertion slot, thereby avoiding dust from accommodating therein to affect the electrical connection. However, after a long-term use, the rubber soft cover may be fractured due to elastic fatigue. Further, once fractured, the rubber soft cover cannot be repaired, so that the insertion slot of the electronic product will be exposed to the outer environment again.

On the other hand, in operation, the rubber soft cover does not have a concrete feeling of finishing a stage, so that the user may not make the rubber soft cover to cover the insertion slot correctly. As a result, the rubber soft cover may fall out of the insertion slot when the electronic product is moved.

Furthermore, the rubber soft cover does not match the shape design of the electronic product, affecting the visual effect of the external appearance of the electronic product.

Consequently, because of the above technical defects, the inventor keeps on carving unflaggingly through wholehearted experience and research to develop the present invention, which can effectively improve the defects described above.

SUMMARY OF THE INVENTION

The object of the present invention is to provide an insertion slot shielding mechanism for an electronic device, which is durable, easy to repair and operate, and has a good aesthetic effect.

For achieving the object described above, the present invention provides an insertion slot shielding mechanism for an electronic device. The insertion slot shielding mechanism is used to shield an insertion slot provided in an opening of a casing of an electronic device. The insertion slot shielding mechanism includes: a shielding means corresponding to the opening and slidably connected to the opening of the casing; and an elastic pushing piece, one end thereof being connected to a side wall within the electronic device corresponding to the opening of the casing, the other end thereof being kept to abut against the shielding means, so that the shielding means can be located in a position to shield the opening by the elastic force of the elastic pushing piece.

The present invention has advantageous effects as follows. With the connection between the elastic pushing piece and the shielding means, the user only needs to push the shielding means slightly to expose the insertion slot. Then, an external transmission line or a power line can be inserted into the insertion slot. Thus, it is very convenient to use. Since the design of the shielding means will not affect the aesthetic effect of the electronic device and also has a stylish feeling. After the transmission line is removed, the shielding means can close the insertion slot automatically due to the elastic force of the elastic pushing piece, so that it is unnecessary for the user to close the shielding means manually. Therefore, the user needs not to worry whether the shielding means is not closed and whether the dust protecting function may fail. Further, since the shielding means is not turned to the outside of the casing but is slidably provided inside the casing, the possibility of fracturing the shielding means can be reduced.

In order to further understand the characteristics and technical contents of the present invention, a detailed description is made with reference to the accompanying drawings. However, it should be understood that the drawings are illustrative only but not used to limit the present invention thereto.

DETAILED DESCRIPTION OF THE PREFERRED EMBODIMENTS

Figure 1:
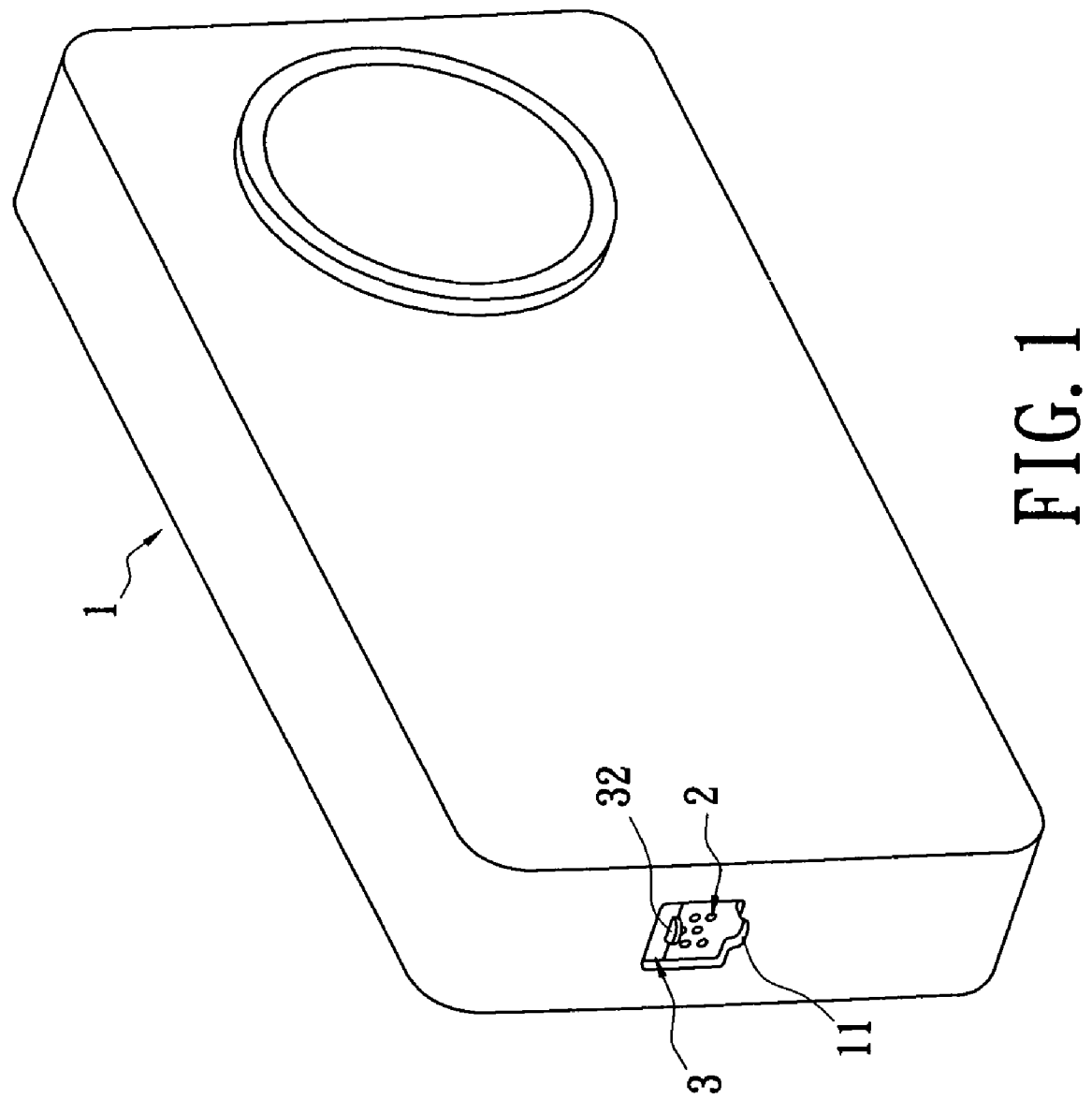
FIG. 1 is a perspective view showing the external appearance of the insertion slot shielding mechanism for an electronic device according to the present invention.
Figure 2:
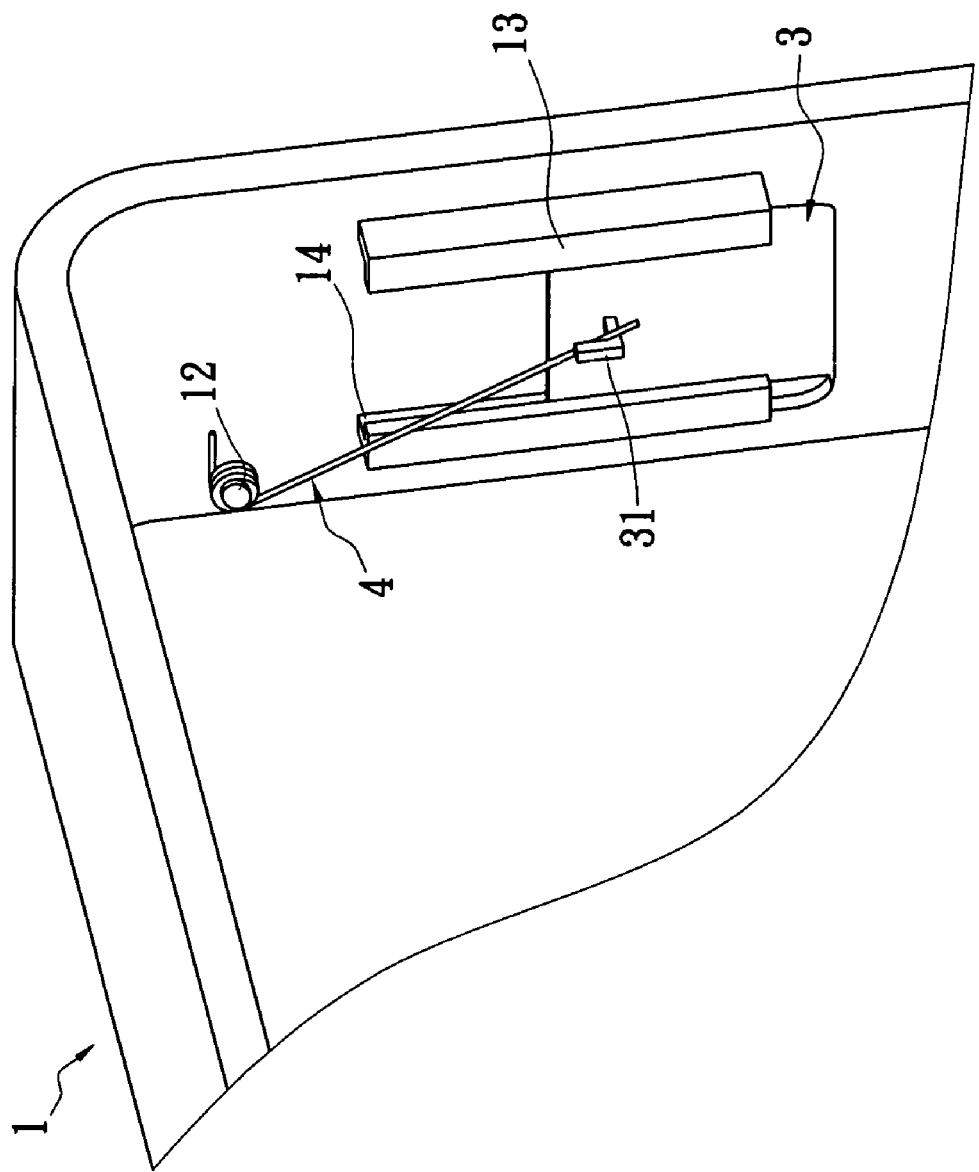
FIG. 2 is a schematic view showing the interior of the insertion slot shielding mechanism for an electronic device according to the present invention.
Figure 3:
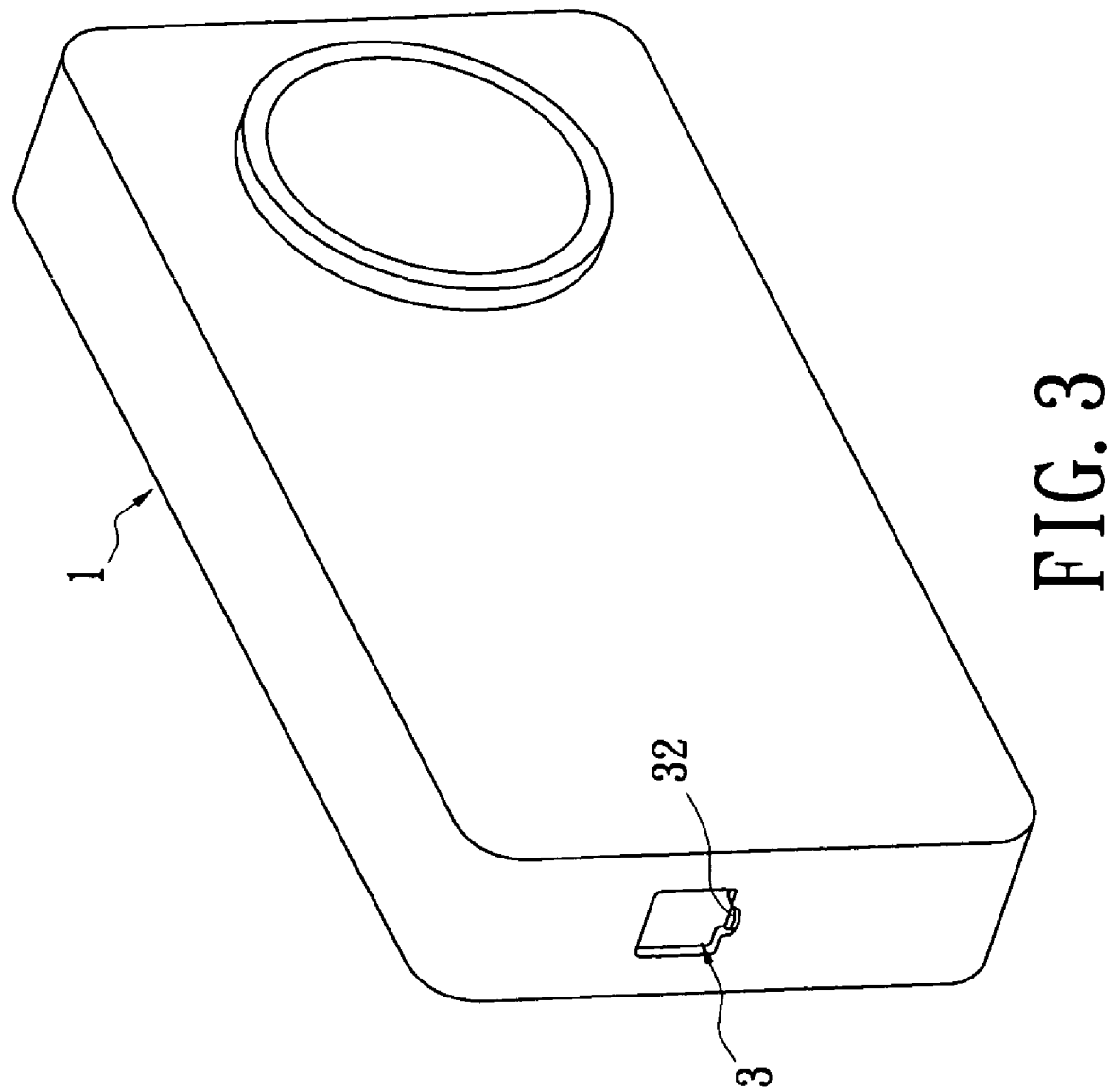
FIG. 3 is a schematic view showing the operating state of the insertion slot shielding mechanism for an electronic device according to the present invention.

The present invention is directed to an insertion slot shielding mechanism for an electronic device, which can be used to protect the insertion slot of an electronic device such as a camera or a mobile phone. Please refer to FIGS. 1 to 3. The casing 1 of the electronic device is provided with an opening 11. The opening 11 of the electronic device is provided therein with an insertion slot 2. According to the present invention, the insertion slot shielding mechanism for an electronic device includes a shielding means 3 slidably connected to the opening 11 of the casing 1, and an elastic pushing piece 4 acting on the shielding means 3.

The casing 1 has a fixed shaft 12 that is formed into a circular protruding block inside its side wall. The elastic pushing piece 4 can be an elastic piece or elastic strip. One end of the elastic pushing piece 4 is wound around the fixed shaft 12, while the other end thereof is of a rod-like structure and extends toward the shielding means 3. The inside of the shielding means 3 corresponding to the opening 11 is provided with an abutting portion 31 like a hook for abutting against the rod-like structure of the elastic pushing piece 4. Via this arrangement, the shielding means 3 can be kept in a position to shield the insertion slot 2 within the opening 11. When the shielding means 3 is moved to open the opening 11, the elastic pushing piece 4 is bent to push the shielding means 3 via its elasticity.

Since the abutting portion 31 is a hook, the rod-like structure of the elastic pushing piece 4 can be restricted in the abutting portion 31 without moving toward the insertion slot 2. In this way, the distal end of the rod-like structure of the elastic pushing piece 4 can be avoided from sliding out of the abutting portion 31.

The elastic pushing piece 4 can be connected to the casing 1 by means of winding around the fixed shaft 12 of the casing 1. In addition, it can be connected to the casing 1 by means of hooking, thermal-welding or other equivalent methods.

Further, the fixed shaft 12 within the casing 1 can be exchanged with the abutting portion 31 of the shielding means 3, so that one end of the elastic pushing piece 4 is connected to the shielding means 3 while the other end abuts against the casing 1.

Both inner sides of the casing 1 near the opening 11 are provided with a bent plate 13 respectively to form two grooves 14. The shielding means 3 is disposed at least to correspond to the opening 11, and two opposite sides of the shielding means 3 are inserted into the two grooves 14, thereby slidably shielding the opening 11 to protect the insertion slot 2.

The outside of the shielding means 3 is provided with a pushing portion 32 for facilitating a user to push the shielding means 3. The pushing portion 32 is in a form of a flange protruding outwardly from the shielding means 3. Of course, the pushing portion 32 can be a rough surface or a recess. In addition, the shielding means 3 can be one of a metallic cover or plastic cover.

Since the shielding means 3 is located between the insertion slot 2 and the opening 11, the shielding means 3 can shield and protect the insertion slot 2. The insertion slot 2 is used to transmit image information or connect to an external power supply. Thus, when the insertion slot 2 is to be used, the user only needs to push the pushing portion 32 of the shielding means 3 slightly. Since the elastic pushing piece 4 is connected between the fixed shaft 12 and the abutting portion 31, the movement of the shielding means 3 drives the elastic pushing piece 4 to make the elastic pushing piece 4 being compressed. As a result, the shielding means 3 moves along the two grooves 14 to expose the opening 11. At this time, the user can insert the transmission line into the insertion slot 2. After use, the transmission line is removed from the insertion slot 2, the elastic pushing piece 4 returns to its original state via the elasticity thereof so as to push the shielding means 3 to return its original position and to close the opening 11, thereby protecting the insertion slot 2. In this way, the user needs not to worry whether the shielding means 3 is not closed and that the dust protecting function may fail to damage the electronic product.

The present invention has the advantageous effects as follows.

(1) The design of the shielding means will not affect the aesthetic effect of the electronic product and also has a stylish feeling.

(2) After use, the shielding means will close the insertion slot automatically. Thus, it is not necessary to close the shielding means manually and the user needs not to worry whether the shielding means is not closed and that the dust protecting function may fail. Therefore, it is very convenient to use.

(3) Since the shielding means can close the opening completely, it is difficult for dust to enter the insertion slot of the electronic device. Therefore, the problem that electrostatic charges are collected by dust damaging the electronic device can be avoided.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An insertion slot shielding mechanism for an electronic device, for shielding an insertion slot provided in an opening of a casing of an electronic device, comprising:
    a shielding means corresponding to the opening and slidably connected to the opening; and
    an elastic pushing piece, wherein the casing has a fixed shaft inside a wall thereof, wherein one end of the elastic pushing piece is wound around the fixed shaft, and the other end of the elastic pushing piece is of a rod-like structure abutting against the shielding means, such that the shielding means is located in a position to shield the opening by the elastic force of the elastic pushing piece.

2. The insertion slot shielding mechanism for an electronic device according to claim 1, wherein each of two opposite inner sides of the casing near the opening is provided with a bent plate respectively to form a groove, two opposite sides of the shielding means are inserted into the grooves.

3. The insertion slot shielding mechanism for an electronic device according to claim 1, wherein an inner surface of the shielding means corresponding to the opening is provided with an abutting portion for abutting against the rod-like structure of the elastic pushing piece.

4. The insertion slot shielding mechanism for an electronic device according to claim 3, wherein the abutting portion is a hook, the rod-like structure of the elastic pushing piece is restricted in the hook.

5. The insertion slot shielding mechanism for an electronic device according to claim 1, wherein an outer surface of the shielding means is provided with a pushing portion.

6. The insertion slot shielding mechanism for an electronic device according to claim 5, wherein the pushing portion is a flange, a rough surface or a recess.

7. The insertion slot shielding mechanism for an electronic device according to claim 1, wherein the shielding means is one of a metallic cover and a plastic cover.

8. The insertion slot shielding mechanism for an electronic device according to claim 1, wherein the electronic device is one of a camera and a mobile phone.

9. The insertion slot shielding mechanism for an electronic device according to claim 1, wherein the elastic pushing piece is an elastic piece or elastic strip.

\* \* \* \* \*